May 7, 1968   R. P. FARRELL, JR., ET AL   3,381,637
APPARATUS FOR DISPOSAL OF SEWAGE SLUDGE
Filed April 11, 1966   2 Sheets-Sheet 2

INVENTORS
ROBERT P. FARRELL, JR.
& JOHANN F. SCHULTE
BY Frank C. Leach jr.
THEIR ATTORNEY

3,381,637
APPARATUS FOR DISPOSAL OF SEWAGE SLUDGE
Robert P. Farrell, Jr., Louisville, and Johann F. Schulte, Valley Station, Ky., assignors to General Electric Company, a corporation of New York
Filed Apr. 11, 1966, Ser. No. 547,066
16 Claims. (Cl. 110—8)

ABSTRACT OF THE DISCLOSURE

The sewage sludge incinerator of this apparatus is operated in a batchwise manner, sewage sludge being charged and then after removal of water by filtration the sludge is heated and dried and finally burned. Novelty of this apparatus centers in the combination of control means for regulating the weight of sludge deposited in the incinerator for disposal by combustion so that the volume of sludge charged into the incinerator on each successive cycle will be varied automatically according to the solids content of the sewage sludge feed.

---

This invention relates to an apparatus for disposing of sewage sludge and, more particularly, to an incinerator for use with a completely self-contained automatic wastewater treating unit and control means for regulating the weight of sludge deposited within the incinerator for disposal thereby.

In a completely self-contained automatic wastewater treating unit of the type disclosed in copending application Ser. No. 374,573, filed June 12, 1964, in the names of Kenneth S. Watson, Robert P. Farrell, Jr., and George E. Bennett and assigned to the same assignee as the present invention, an incinerator is employed for disposing of the sewage sludge. This incinerator has a fixed volume of sludge deposited therein during each cycle of operation of the incinerator for disposal thereby.

However, the concentration of solids within the sewage sludge varies from about 5,000 milligrams per liter (0.5% solids) to 20,000 milligrams per liter (2.0% solids) with the majority of the sludge having a concentration of 1 to 1.5% solids. Thus, the incinerator of aforesaid application Ser. No. 374,573 burns a weight of solids during each cycle of its operation dependent on the concentration of solids within the fixed volume of sludge so that the weight of solids being burned may vary substantially.

The present invention is an improvement of the incinerator of aforesaid application Ser. No. 374,573 since it burns a substantially constant weight of solids during each cycle of operation irrespective of the volume of sludge introduced into the incinerator and the concentration of solids within the sludge. This insures the removal of a substantially constant weight of solids during each cycle of operation of the incinerator.

In order that a substantially constant weight of solids will be deposited within the incinerator of the present invention during each cycle of operation of the incinerator for disposal thereby, the flow of sludge through the incinerator must be stopped when the weight of solids deposited within the incinerator is within a predetermined range. The present invention satisfactorily solves this problem by including a device that automatically prevents further flow of sludge when a weight of solids within the predetermined range is deposited within the incinerator for disposal thereby.

Since the sludge contains between 98 to 99.5 percent of liquid, the quantity of this moisture must be reduced before any heating is performed to avoid pressure problems within the incinerator and to avoid the cost of evaporating large quantities of moisture electrically. The present invention meets these requirements by reducing the moisture to approximately 90 percent before any heating occurs.

As set forth in copending application Ser. No. 458,453, filed May 24, 1965, in the names of Kenneth S. Watson and George E. Bennett, and assigned to the same assignee as the present invention, there is disclosed a method for adding polyelectrolytes to a sludge after it has been aerated to provide an effluent water of higher quality than previously obtainable through the use of bio-oxidation alone or polyelectrolyte treatment alone. When using this method, it is desirable to preserve the formed floc particles as they are fed to the incinerator since their size determines the ease and speed with which the sludge is deposited within the incinerator.

The present invention satisfactorily solves this problem by gentle handling of the floc particles at low velocity as they are directed into the interior of the incinerator. Thus, the effect of the addition of the polyelectrolytes is not lost when using the incinerator of the present invention.

An object of this invention is to provide an incinerator for burning a substantially constant weight of solids during each cycle of operation of the incinerator.

Another object of this invention is to provide a control device for an incinerator to stop flow of sludge to the incinerator when a predetermined weight of solids is accumulated within the incinerator for disposal thereby.

Other objects will be readily perceived from the following description, claims, and drawings.

This invention relates to an incinerator including a combustion chamber with a foraminous member mounted therein and means to introduce sludge or the like into the interior of the foraminous member for flow therethrough whereby solids are deposited on the foraminous member. The flow of sludge or the like to the interior of the foraminous member is stopped by suitable means. Heating means, disposed within the combustion chamber, are activated by means after the sludge stopping means is actuated to burn the solids deposited on the foraminous member. Means remove burned solids from the foraminous member.

This invention also relates to an apparatus for controlling the amount of solids deposited on a foraminous member of an incinerator. The apparatus includes a tank, which receives sludge or the like at its upper end, with the tank communicating at its lower end with the interior of the foraminous member to permit flow of sludge or the like from the tank to the interior of the foraminous member. Means mounted within the tank stop flow of sludge or the like within the tank reaches a predetermined level.

The attached drawings illustrate a prefered embodiment of the invention, in which:

FIGURE 4 is a schematic wiring diagram illustrating the controlled operation of heater means and motor means of the FIGURE 1 apparatus.

Figure 1:
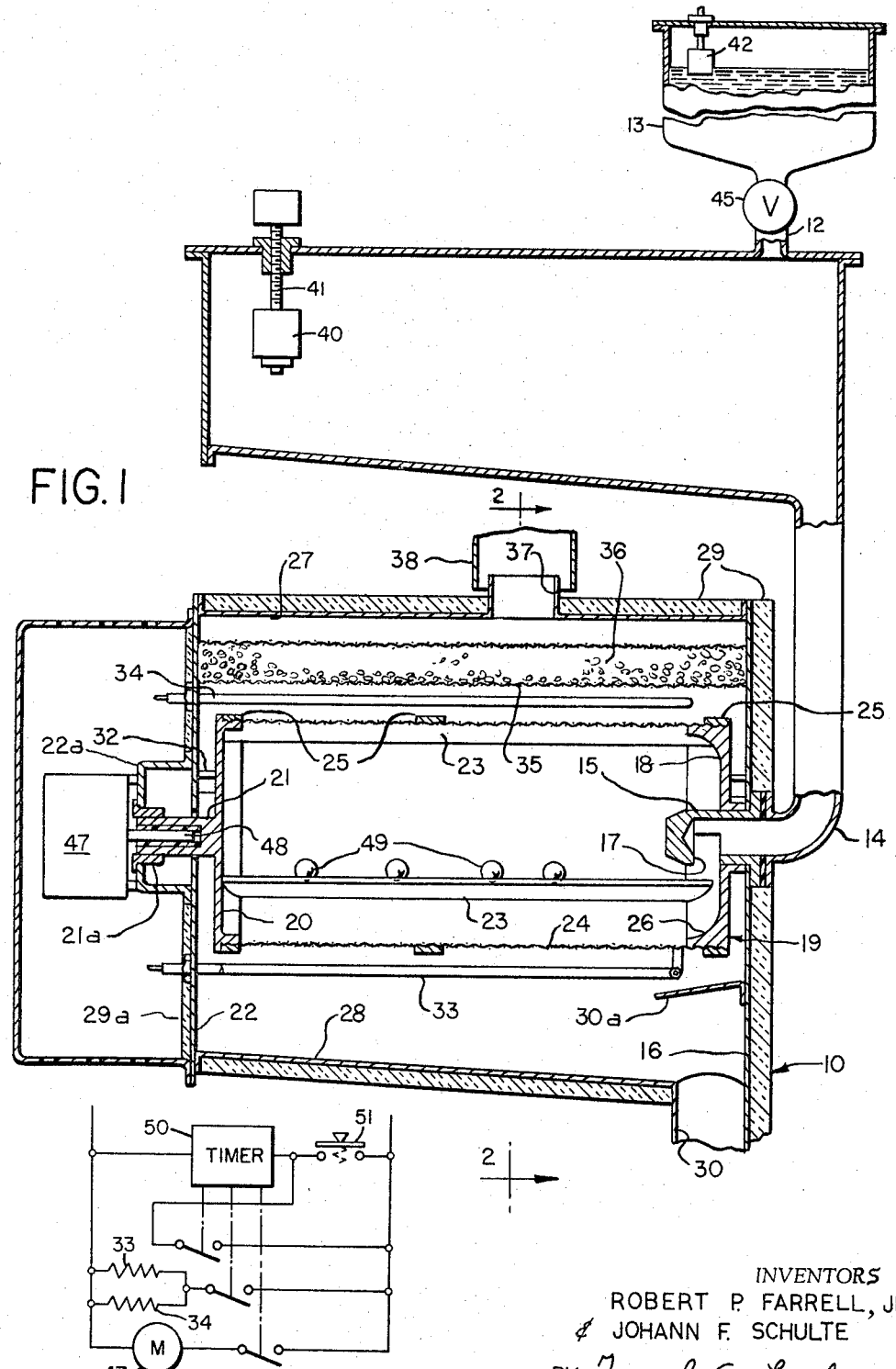
FIGURE 1 is a side sectional view of the apparatus of the present invention.

Referring to the drawings and particularly FIGURE 1, there is shown an incinerator 10 with a sludge tank 11 disposed thereabove. The sludge tank 11 has a conduit 12 extending from its upper end and communicating with a treating chamber 13 of the type shown and described in aforesaid copending application Ser. No. 374,573. Thus, thin sludge is supplied through the conduit 12 to the sludge tank 11 from the treating chamber, flow of sludge through conduit 12 being controlled by valve 46, as will be described.

The lower end of the sludge tank 11 has a conduit 14 extending therefrom and communicating with the interior of the incinerator 10 to allow sludge to flow from the sludge tank 11 to the interior of the incinerator 10. The conduit 14 communicates at its lower end with the interior of the incinerator 10 through a passage within a support member 15, which is secured to an end wall 16 of an insulated housing, and an opening 17 in the lower surface of the support member 15 so that the thin sludge is directed downwardly as it leaves the support member 15.

An annular member 18, which forms one end of a drum 19, is rotatably mounted on the support member 15. The drum 19 has its other end formed by an annular member 20, which is rotatably mounted by a reduced portion 21 within a bearing 21a. The bearing 21a is mounted on a member 22a, which is attached to an end wall 22 of the insulated housing.

The members 18 and 20 of the drum 19 are connected to each other by three ribs 23 (see FIGURE 2), which are spaced approximately 120° from each other and rigidly secured to the members 18 and 20. An open mesh or foraminous member 24 extends around the circumferences of the members 18 and 20 and has a snug fit therewith to form a cylindrical member. A plurality of rings 25 is rigidly secured to the exterior surface of the open mesh member 24 to provide support thereto.

The open mesh member 24 must have a size that will prolong its life, produce a desired filtering effect, and permit sifting of ashes therefrom after solids deposited on the mesh member 24 are burned. One suitable example of the open mesh member 24 is a corrosion and heat resistant stainless steel screen having a 20 x 20 mesh with a wire diameter of .020 inch. The open area of the mesh is 36 percent of the total area. Any other suitable size screen with other wire diameters and open areas may be employed as long as the desired long life, filtering effect, and ash sifting effect are obtained. Thus, the open mesh or foraminous member 24 could be formed of perforated metal or porous ceramic material, for example.

The inner surface of the annular member 18 of the drum 19 is curved at 26 to direct the sludge flowing through the opening 17 in a direction substantially parallel to the surface of the open mesh member 24. This arrangement prevents the sludge from impinging on the open mesh member 24 with a downward velocity component, which would have sufficient force to prevent formation of a cake of solids on the open mesh member 24 and to break up the formed floc particles. Any other type of suitable construction may be employed wherein the sludge enters the interior of the open mesh member 24 so as to minimize disturbances of the solids being formed on the open mesh member 24.

Figure 2:
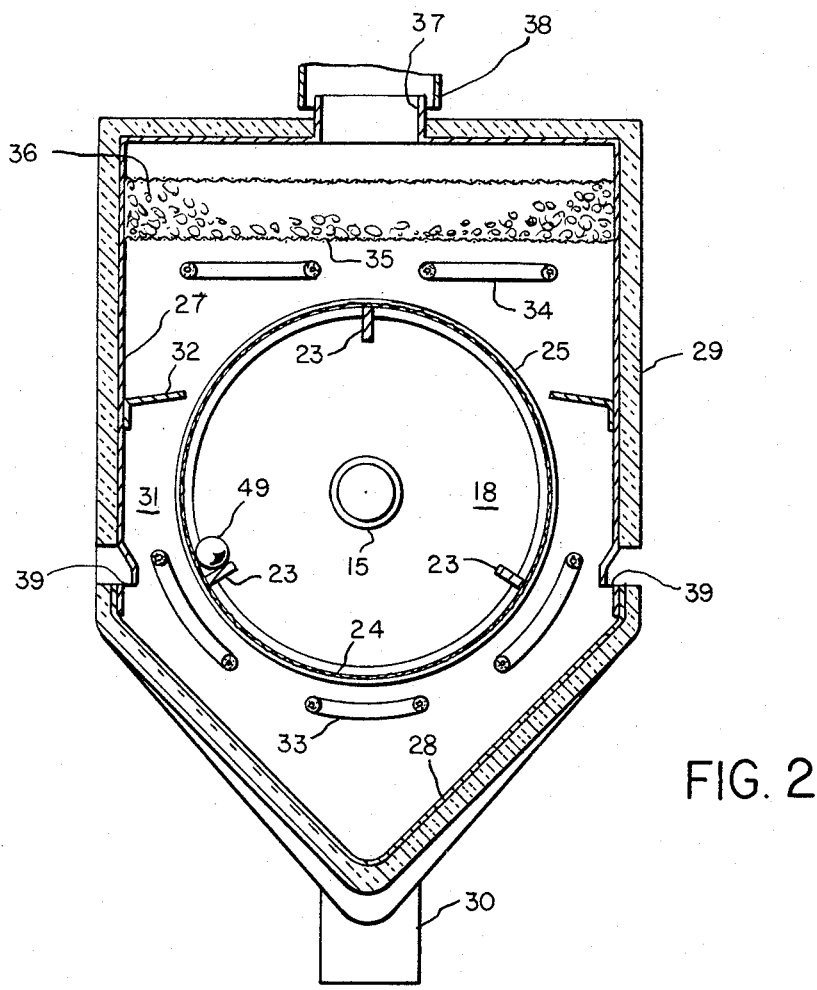
FIGURE 2 is a sectional view of the incinerator of the present invention and taken along the line 2—2 of FIGURE 1.

As shown in FIGURE 2, the insulated housing has an upper wall 27 and a lower wall 28. The walls 27 and 28 are secured to each other and to the end walls 16 and 22 to form the insulated housing. The walls 16, 22, 27, and 28 are formed of a heat and corrosion resistant material such as type 321 stainless steel, for example.

Thermal insulation 29, which may be glass wool or asbestos, for example, is disposed on the exterior surface of the walls 16, 27, and 28. An asbestos board 29a, which is sold under the trademark Transite or Marinite, is secured to the exterior surface of the wall 22 for insulating purposes.

The lower wall 28 is tapered to allow the sludge filtrate to flow by gravity to an outlet conduit 30, which communicates with the treating chamber whereby the filtrate returns thereto. A baffle 30a extends from the wall 17 to prevent hot ash or the like from falling directly down the conduit 30 into other areas of the wastewater treatment system not designed to withstand high temperatures.

The walls 16, 22, 27, and 28 of the insulated housing define a combustion chamber 31, which is divided into an upper portion and a lower portion by baffles 32 extending from opposite portions of the upper wall 27 and extending between the walls 16 and 22. A sheath type electric heater 33 is disposed in the lower portion of the combustion chamber 31, and a sheath type electric heater 34 is disposed in the upper portion of the chamber 31.

A screen 35 is supported in the insulated housing above the upper heater 34. The screen 35 supports a combustion catalyst 36 therein. One suitable example of the catalyst 36 is activated alumina pellets, which may be purchased from the Chemicals Division of Kaiser Aluminum and Chemical Corporation of Baton Rouge, La. This activated alumina is identified by Kaiser as Experimental Grade X–01–A. It has a residual water of less than 3 percent with its bead size being approximately 8 mesh.

The position of the catalyst 36 results in all of the gases passing therethrough before escaping from the housing through a vent 37. The alumina pellets function as a combustion catalyst in the exhaust gas stream to complete combustion of the escaping gases. The catalyst 36 is necessary because some of the volatile gases will not burn in the combustion chamber 31 since the temperature is not high enough. However, the catalyst 36, which is selected in accordance with the chemical constituents of the volatile gases, causes the volatile gases to be oxidized at the lower temperatures.

The vent 37 communicates with a stack 38, which leads to the exterior of the building in which the housing is mounted. The vent 37 is so positioned with respect to the stack 38 that cool ambient air, exterior of the insulated housing, is mixed with the gases escaping from the insulated housing through the vent 37 to dilute them and reduce the exit temperature.

A centrifugal blower (not shown) is disposed at the entrance to the stack 38 and is loosely coupled to the vent 37. This loose coupling is provided by disposing the inlet of the blower about one-half inch above the exit of the vent 37. This insures that there is a negative pressure zone into which the gases and vapor are discharged so that they are positively drawn into the stack 38 while minimizing wasted heat and keeping the temperature of the stack 38 low.

Air for combustion purposes is supplied to the combustion chamber 31 through a plurality of openings 39 in the lower portion of the upper wall 27 of the insulated housing. The size of the openings 39 is selected to provide a slight but positive natural draft through the combustion chamber 31 to produce optimum combustion therein with a minimum of wasted heat and low stack temperatures.

As shown in FIGURE 1, a level switch 40 is mounted on a threaded rod 41, which extends downwardly from the top of the sludge tank 11 and is movable with respect to the top of the tank 11. Thus, the position of the switch 40 within the tank 11 is adjustable whereby the switch 40 is energized when the sludge within the tank 11 rises to the level at which the level switch 40 is disposed.

Figure 3:
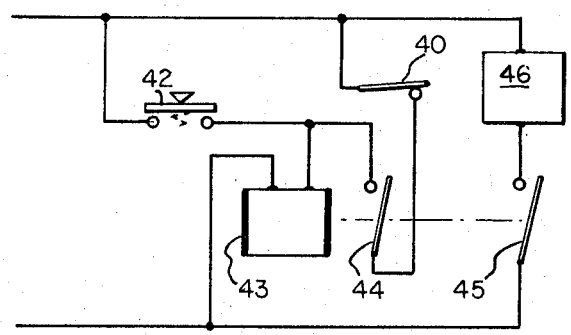
FIGURE 3 is a schematic wiring diagram.

As shown in FIGURE 3, the level switch 40 is part of a circuit that controls the supply of sludge to the sludge tank 11 and the incinerator 10. When sludge is to be supplied from the treating chamber through the conduit 12 to the sludge tank 11, a normally open switch 42 is closed momentarily to energize a relay coil 43. Energization of the coil 43 results in normally open switches 44 and 45 being closed.

The switch 42 is closed when there is sufficient sludge within the treating chamber to insure that the predetermined quantity of solids may be deposited on the mesh member 24. The switch 42 may be closed, for example, when the sludge within the treating chamber reaches a predetermined level.

When the normally open switch 45 is closed, a control member 46 is energized. This may be either a valve or a pump depending upon the position of the sludge tank 11 with respect to the treating chamber of the wastewater treating unit.

If the treating chamber is above the sludge tank 11, then the control member 46 is a valve since the sludge will flow from the lower portion of the treating chamber to the sludge tank 11 by gravity. However, if the sludge tank 11 is disposed above the lower portion of the treating chamber, then the control member 46 would be a pump to lift the sludge from the lower portion of the treating chamber in which it is collected to the sludge tank 11.

The closing of the normally open switch 44 by energization of the relay coil 43 results in a hold circuit for the relay coil 43 being formed through the normally closed level switch 40 and the switch 44 whereby the relay remains energized even though the switch 42 again opens. Thus, the circuit of FIGURE 3 requires only a momentary closing of the switch 42 to begin the cycle. Thereafter, the coil 43 remains energized until the level switch 40 is opened due to the level of the sludge within the sludge tank 11 reaching the level switch 40. When this occurs, the coil 43 is no longer energized since the hold circuit is broken whereby the switches 44 and 45 open. Opening of the switch 45 results in the control member 46 being de-energized to stop the flow of sludge to the sludge tank 11 from the treating chamber.

Considering the operation of the present invention, thin sludge is supplied from the lower portion of the treating chamber to the sludge tank 11 when the normally open switch 42 closes. The switch 42 preferably is automatically actuated when the level of the sludge within the treating chamber reaches a level that insures a quantity of solids within a predetermined range will be deposited on the open mesh member 24.

Closing of the switch 42 results in sludge being supplied from the bottom of the treating chamber to the sludge tank 11 through the conduit 12. The thin sludge flows through the conduit 14 into the passage in the hollow support member 15 and through the opening 17 into the interior of the open mesh member 24. As previously mentioned, the curved surface 26 of the member 18 of the drum 19 directs the sludge substantially parallel to the surface of the open mesh member 24 to avoid direct impingement normal thereto and thereby aid the formation of the desired sludge cake.

When the sludge initially enters the interior of the open mesh member 24, is flows readily therethrough because of the size of the openings of the mesh member 24. However, some larger solid particles start to collect on the open mesh member 24.

Since the sludge comprises at least 90 percent moisture, it continues to flow through the open mesh member 24 and exit from the housing through the conduit 30, which returns the filtrate to the treating chamber. A pump may be required to return the filtrate to the top of the treating chamber depending upon the position of the bottom of the insulated housing with respect to the top of the treating chamber.

As the solids begin to form into a filter cake or mat on the open mesh member 24, the quantity of solid particles collected on the open mesh member 24 begins to increase whereby the rate of flow of sludge through the open mesh member 24 decreases. The rate of flow through the open mesh member 24 decreases because of the increasing deposit of solids thereon. Furthermore, with the retention of solids on the open mesh member 24 increasing, the filtrate becomes increasingly clearer after it passes through the open mesh member 24.

This increasing thickness of the solids on the open mesh member 24 results in the level of the sludge within the sludge tank 11 beginning to rise. As the level of the sludge within the tank 11 rises, the static hydraulic pressure within the interior of the open mesh member 24 increases whereby further formation of solids on the open mesh member 24 results. It should be understood that the original formation of solid particles occurs along the bottom portion of the open mesh member 24 and then progresses upwardly and around the open mesh member 24 until the top portion is finally covered with solids.

When sufficient resistance to the flow of sludge through the open mesh member 24 occurs because of the formation of the solid filter cake thereon, the level of sludge within the sludge tank 11 reaches the level switch 40. When this occurs, the control member 46 is de-energized to stop further flow of sludge to the sludge tank 11 and the incinerator 10.

It should be understood that the volume of the sludge tank 11, the size of the open mesh member 24, the total open area of the mesh member 24, the flow rate of the sludge into the sludge tank 11, and the position of the level switch 40 within the sludge tank 11 may be varied. Accordingly, any desired weight of solids may be deposited on the open mesh member 24 depending on the selected value of each of the previously mentioned variables. Thus, a substantially constant weight of sludge solids may be collected on the open mesh member 24 irrespective of the volume of sludge flowing therethrough.

The following table of test data shows a variance in volume of 110 percent for ten different runs while the weight of solids removed varied only 27 percent:

| Test Number | Volume in Liters | Percent of Solids in Applied Sludge | Dry Weight of Solids Retained in Grams |
| --- | --- | --- | --- |
| 1 | 53.0 | 1.32 | 111 |
| 2 | 29.7 | 1.18 | 108 |
| 3 | 25.2 | 1.16 | 113 |
| 4 | 31.5 | 1.16 | 120 |
| 5 | 30.6 | 1.15 | 104 |
| 6 | 29.7 | 1.05 | 119 |
| 7 | 30.7 | 1.24 | 132 |
| 8 | 29.4 | 1.12 | 126 |
| 9 | 32.1 | 1.17 | 123 |
| 10 | 35.7 | 1.13 | 131 |

It should be understood that there must be sufficient sludge available within the treating chamber to provide the amount of solids for obtaining the substantially constant weight irrespective of the volume. If there is not sufficient weight, the switch 42 will not be closed until this amount of sludge is available.

When the flow of sludge to the incinerator 10 is stopped, the FIG. 4 control circuit including a timer 50 is energized by momentary closing of starter switch 51 to commence the sequence of time and temperature controlled events described below. This timer permits the moisture within the solid particles on the open mesh member 24 to drip therefrom for a predetermined time period, which is preferably three hours, to reduce the moisture content of the solid cake formed on the open mesh member 24. This reduces the moisture content from approximately 99 percent to 90 percent.

At the end of this time period, the timer 50 causes energization of the heaters 33 and 34 to drive off the remaining moisture within the solid particles on the open mesh member 24 at a sufficiently low rate to avoid gas pressure build up that would cause reversal of air flow through the vents 37 and 39. After the heaters 33 and 34 have been energized for approximately one hour and the surface layers of the sludge cake are thoroughly dried out, a motor 47 is energized. The motor 47 has its shaft 48 connected to the reduced portion 21 of the member 20 of the drum 19 to cause rotation of the open mesh member 24.

The drum 19 rotates at a slow steady speed in the range of two to ten r.p.m. As soon as this rotation begins, there is a sudden temporary drop in the temperature of the combustion chamber 31 as moisture trapped in the interior of the filter cake is released by the tumbling action. During the entire drying stage, the volatile gases pass through the catalyst 36 whereby they are completely oxidized.

The temperature within the open mesh member 24 continues to rise until it reaches a range of 1300 to 1400° F. At this time, the surface of the filter cake of solids on the open mesh member 24 has burned completely.

As the drum 19 is rotated, freely movable members within the mesh member 24 such as balls 49 tumble from one of the ribs 23 onto a portion of the cake built up on the open mesh member 24. As the balls 49 strike the burned cake, fresh unoxidized surface is constantly exposed as the ash is knocked off by the balls 49. This insures that every portion of the sludge cake is exposed to the air and temperature necessary for complete oxidation.

It should be understood that the path of the tumbling balls 49 is a function of the speed of rotation of the drum 19, the geometry of the drum, particularly its diameter, and the spacing angles between the ribs 23. With the operating speed between two and ten r.p.m., it is necessary for the ribs to be spaced approximately 120° from each other. If they were spaced only 90° from each other, for example, with the speed of rotation being between two and ten r.p.m., the location of the ribs 23 would reduce the effectiveness with which the balls 49 flake off the ash on the open mesh member 24 since the balls 49 would contact the mesh member 24 in a locally stiffened area adjacent to a rib and the mesh member 24 would be resistant to the flexing action essential to its self-cleaning behavior.

As the surface of the open mesh member 24 begins to burn clean, the fine particles of ash start to filter through the open portion of the mesh member 24. During this portion of the cycle, the solid residue passes through the open mesh member 24 at a slow rate in the form of finely divided discrete particles. As these particles filter downward onto the bottom wall 28 of the combustion chamber 31, they are exposed to an excess of air at a high temperature so that any particles which may not have been oxidized already have a further opportunity to be completely burned.

When the solids on the open mesh member 24 are completely burned, the temperature within the combusion chamber 31 drops noticeably below its peak value because the sludge ceases to contribute heating value. Thus, a thermostat (not shown), which senses the temperature, causes de-energization of the heaters 33 and 34 when all of the solids on the open mesh member 24 are completely burned as indicated by the temperature falling below its peak value.

The ash accumulates in the bottom of the combustion chamber 31. The ash is removed during the next cycle of operation of the incinerator 10 by the flow of the thin sludge through the open mesh member 24 and into the conduit 30.

The motor 47 continues to run for a period of time during the cool down period to insure that all the ash is finely divided and sifted through the mesh member 24 in preparation for the subsequent cycle of operation. It is then turned off by a timer or thermostat after a suitable extended tumbling period.

The size of the open mesh member 24 must be fine enough to cause a filter cake of solids to form on the open mesh member 24 in a reasonable time during the flow of sludge through the open mesh member 24. Furthermore, the size of the open mesh member 24 must be such as to allow the ash to pass freely therethrough to the exterior of the open mesh member because there must not be a progressive build up of ash from cycle to cycle. If this were to occur, the open mesh member 24 would eventually clog and render the device useless.

While the open mesh or foraminous member 24 has been shown a cylindrical in configuration, it should be understood that any other suitable shape could be employed if desired. While the combustion chamber 31 has been disclosed as being polygonal in shape, it should be understood that it may by cylindrical if desired.

It should be understood that the drum 19 could be mounted in the combustion chamber 31 for movement other than rotatable. Thus, it is only necesary for the drum 19 to be agitated in some manner to cause the balls 49 to strike the burned cake on the open mesh member 24 and to aid in sifting the ash through the open mesh member 24.

The present invention not only dewaters thin sludge and removes the moisture from the filter cake on the open mesh member but also burns the volatile constituents. It also provides storage for the non-volatile ash residue and controls the smoke and odor emission to the atmosphere. Furthermore, since the sludge, which has passed through the open mesh member 24, is returned to the treating tank chamber, there is no problem concerning the quantity of the sludge being passed through the open mesh member 24.

An advantage of this invention is that it reduces the moisture content of the solid particles before burning to prevent high pressure within the incinerator and to keep the heat requirements within economically feasible limits. Another advantage of this invention is that it insures that a substantially constant weight of solids is burned during each cycle of operation of the incinerator despite wide fluctuations in the physical characteristics of the applied sludge.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. An incinerator including a combustion chamber, a foraminous member mounted in said combustion chamber, means to introduce sludge or the like into the interior of said foraminous member for flow therethrough whereby solids are deposited on said foraminous member, means to stop flow of sludge or the like to the interior of said foraminous member, said combustion chamber having heating means therein, means to activate said heating means after said sludge stopping means is actuated to burn the solids deposited on said foraminous member, and means to remove burned solids from said foraminous member.

2. The incinerator according to claim 1 in which said burned solids removal means includes means to agitate said foraminous member after said heating means is activated.

3. The incinerator according to claim 1 in which said foraminous member is rotatably mounted in said combustion chamber and said burned solids removal means includes means to rotate said foraminous member after said heating means is activated.

4. The incinerator according to claim 1 including exhaust means for said combustion chamber and oxidizing means disposed between said foraminous member and said exhaust means for completing combustion of escaping volatile gases.

5. The incinerator according to claim 1 in which said heating means includes first heating means positioned below said foraminous member and second heating means above said foraminous member.

6. The incinerator according to claim 1 including means to actuate said sludge stopping means when said foraminous member has a weight of solids within a predetermined range deposited thereon.

7. The incinerator according to claim 1 including means to direct the sludge or the like into said foraminous member substantially parallel to said foraminous member.

8. The incinerator according to claim 3 in which said foraminous member is cylindrical.

9. The incinerator according to claim 2 including means movable within said foraminous member during agitation of said foraminous member to remove burned solids from said foraminous member.

10. The incinerator according to claim 8 including means movable within said cylindrical foraminous member during rotation of said cylindrical foraminous member to remove burned solids from said cylindrical foraminous member.

11. The incinerator according to claim 9 in which said movable means comprises at least one freely movable member within said foraminous member and a plurality of spaced ribs extending inwarly from the inner surface of said foraminous member for cooperation with said freely movable member whereby said freely movable member tumbles from each of said ribs onto the burned solids on said foraminous member as said foraminous member is agitated.

12. The incinerator according to claim 10 in which said movable means comprises at least one freely movable member within said cylindrical foraminous member and a plurality of spaced ribs extending inwardly from the inner surface of said cylindrical foraminous member for cooperation with said freely movable member whereby said freely movable member tumbles from each of said ribs onto the burned solids on said cylindrical foraminous member as said cylindrical foraminous member rotates.

13. The incinerator according to claim 12 in which said ribs are spaced approximately 120° from each other.

14. In an incinerator apparatus including a foraminous member and a tank to receive sludge at its upper end and communcating with the interior of the foraminous member for sludge flow from the tank into the interior of the foraminous member, the combination of means coupled to the tank to stop the flow of sludge to the tank when the sludge within the tank reaches a predetermined level.

15. The apparatus according to claim 14 in which the sludge flow stopping means is adjustably mounted in the tank to vary the amount of solids deposited on the foraminous member.

16. The apparatus according to claim 14 in which the sludge flow stopping means is a level switch.

References Cited

UNITED STATES PATENTS

| | | | |
|---|---|---|---|
| 1,697,524 | 1/1929 | Epstein | 110—101 |
| 1,961,351 | 6/1934 | Gustin | 110—7 X |
| 2,213,667 | 9/1940 | Dundas et al. | 110—14 |
| 2,265,750 | 12/1941 | Tate | 110—101 |
| 3,098,458 | 7/1963 | Lantz | 110—14 |

JAMES W. WESTHAVER, *Primary Examiner.*